May 24, 1960

E. H. ENGVALL 2,937,844

POTATO BAGGING MACHINE

Filed Jan. 11, 1957

INVENTOR.
EARL H. ENGVALL
BY
Williamson, Schroeder,
Adams + Meyers
ATTORNEYS

May 24, 1960 E. H. ENGVALL 2,937,844
POTATO BAGGING MACHINE
Filed Jan. 11, 1957 2 Sheets-Sheet 2
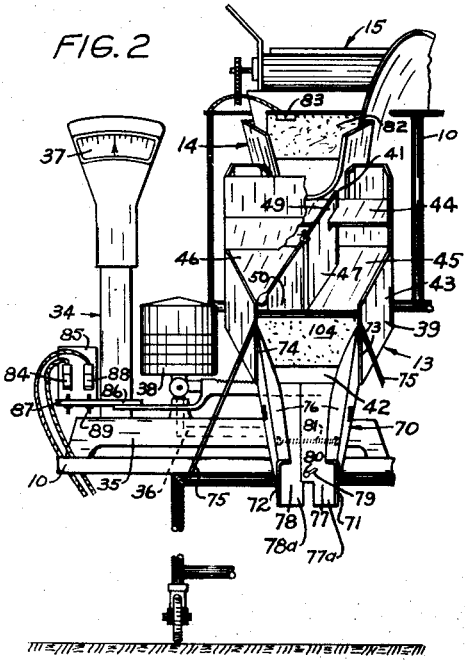
INVENTOR.
EARL H. ENGVALL
BY Williamson, Schroeder,
Adams + Meyers.
ATTORNEYS

United States Patent Office 2,937,844
Patented May 24, 1960

2,937,844

POTATO BAGGING MACHINE

Earl H. Engvall, 5800 69th Ave. N., Minneapolis, Minn.

Filed Jan. 11, 1957, Ser. No. 633,665

5 Claims. (Cl. 249—31)

This invention relates to materials handling and segregating machines and more particularly to a machine for segregating predetermined weighed portions of potatoes for bagging the same.

An object of my invention is to provide a new and improved machine for rapidly segregating accurately weighed portions of bulky materials such as potatoes and the like.

Another object of my invention is to provide in a machine for segregating predetermined portions of potatoes and the like, novel weighing apparatus arranged to continuously receive and collect potatoes and to periodically dump the potatoes in response to accurately weighing of potatoes collected.

Still another object of my invention is the provision in a machine for weighing and segregating predetermined quantities of potatoes and the like, improved weighing apparatus having a multi-compartmented container which is arranged so that one of the compartments is always being filled even as potatoes are being dumped from the other compartment so as to facilitate handling of a continuously moving supply of potatoes.

A further object of my invention is to provide an improved weighing apparatus for segregating predetermined quantities of potatoes and the like wherein the inlet and outlet of the potato-carrying container are both opened and closed in a single movement of a control gate.

A still further object of my invention is the provision in a machine for rapidly segregating accurately weighed portions of potatoes and the like, a novel discharge spout having a diminished end for guiding potatoes into a bag and being constructed to facilitate rapid movement of the potatoes therethrough.

These and other objects and advantages of my invention will more fully appear from the following description made in connection with the accompanying drawings wherein like reference characters refer to the same parts throughout the several views and in which:

Fig. 2 is a detail front elevation view of a portion of the machine and having certain portions partly broken away for sake of clarity;

Fig. 3 is a top plan view of the forward end portion of the machine;

Fig. 5 is a schematic circuit diagram showing the electrical apparatus for operating the machine and also incorporating certain mechanical parts in outline to show with clarity the relations between the electrical and mechanical portions of the machine.

Figures 1, 4:
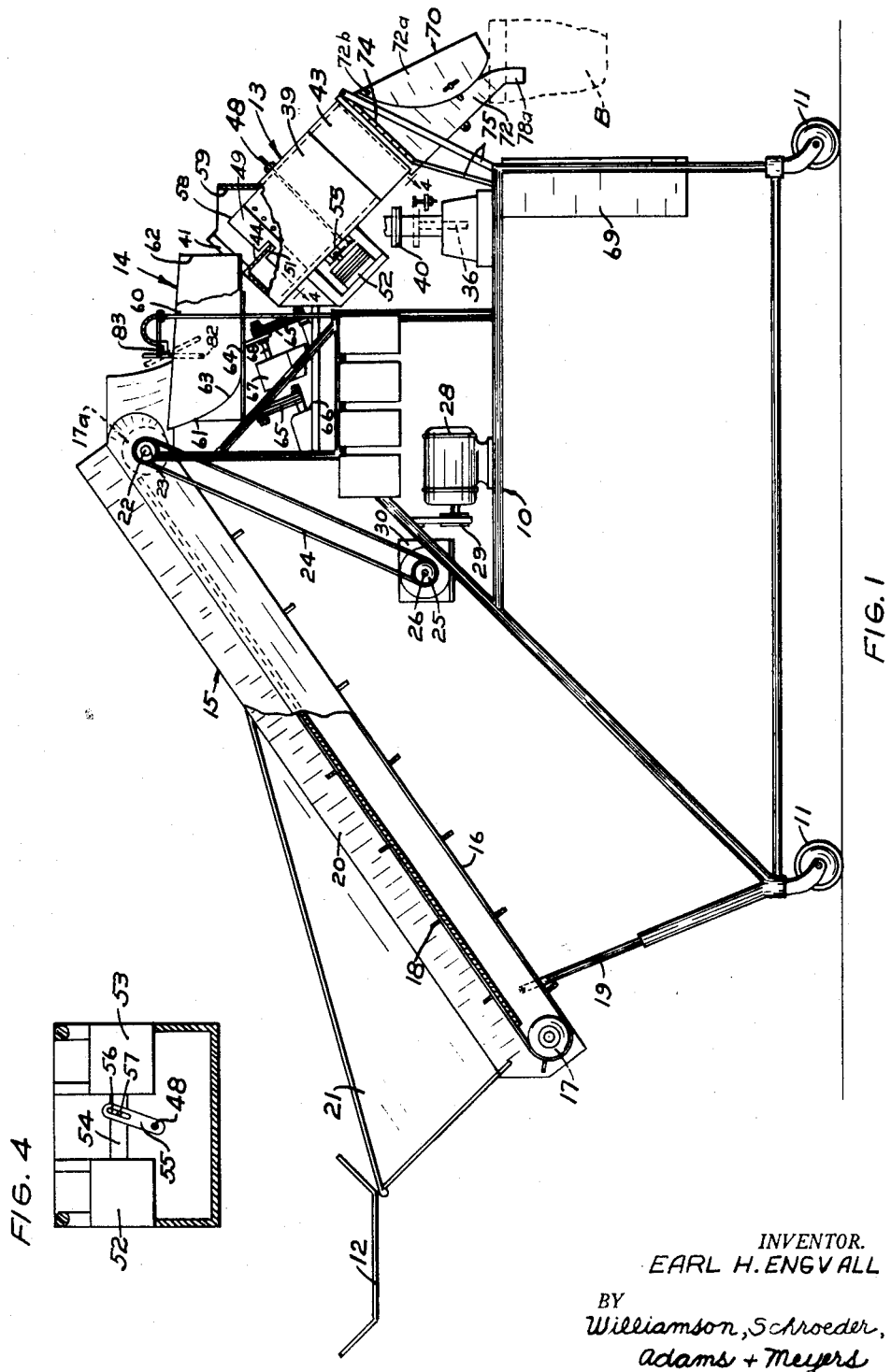
Fig. 1 is a side elevation view, partly broken away of the machine comprising the present invention.
Fig. 4 is a detail section view taken on an inclined plane substantially as indicated at 4—4 of Fig. 1.

One form of the invention is shown in the drawings and is described herein. The instant form of the invention is particularly adapted for measuring and segregating predetermined weights of material comprising a mass of individual articles such as potatoes and the like. The machine includes a supporting structure or frame which is indicated in general by numeral 10, and which is mounted on castor wheels 11 to facilitate moving the machine into the desired operating position so as to be located adjacent a supply of potatoes which may be carried as by a conveyor 12 in the processing plant.

The machine is provided with material-weighing mechanism, indicated in general by numeral 13, continuous conveyor mechanism 14 for supplying potatoes and the like to the weighing mechanism 13 and material supplying means 15 for rapidly carrying potatoes from the supply thereof to the conveying mechanism 14. As best seen in Fig. 3, the present machine provides dual apparatus in each of the mechanisms 13, 14 and 15 on opposite sides of the machine, and thereby effectively comprises two material segregating and measuring machines. The apparatus is, for the most part, duplicated on each side of the machine and except where specifically noted, an understanding of the mechanisms on one side of the machine will suffice for an understanding of the complete machine.

The supplying mechanism indicated in general by numeral 15 comprises an endless belt conveyor 16 trained around rotary guides 17 and having paddles or flights 18 secured thereto for carrying the potatoes. The rollers 17 are suitably journalled in the supporting structure and the rear end portion of the conveyor supporting structure is mounted upon an extendible rod 19 so as to vary the inclination of the conveyor 16 and to change the height of the rear end portion thereof. Identical conveyors 16, on the opposite sides of the machine are separated by an upstanding wall 20 and both of the conveyors 16 move through a common supply hopper 21 for carrying the potatoes therefrom. The upper rollers 17a are affixed to shaft 22 which is journalled in the supporting structure and which is divided intermediate its length into a pair of separate and coaxial sections 20a and 20b respectively. Rollers 17a are individually driven by the shaft sections 20a and 20b which are provided with sprockets 23 over which roller chains 24 are trained. Driving sprockets 25 are keyed to coaxial shafts 26 on opposite sides of the machine, and each of the coaxial shafts 26 is connected with a clutch mechanism 27. A motor 28 is connected by a belt 29 to a gear box 30, the output shaft 31 of which is drivably connected with each of the clutch mechanisms 27. Each of the clutch mechanisms 27 is provided with a swingable control arm 32 which is pivotally mounted on the supporting structure and which is secured to the armature of a solenoid 33 which when energized swings the control arm 32 and disengages the clutch 27. It will be seen that each of the conveyors 16 is separately controllable for delivering potatoes to the upper end thereof.

The weighing and segregating mechanism 13 includes a scale, best seen in Fig. 2, and indicated in general by numeral 34. The scale 34 is provided with a base 35 which is suitably affixed upon the supporting structure 10, a balance arm 36 which is conventionally fulcrumed, an indicator 37 connected with one end of the balance arm, counterweight 38 which is also connected with one end of the balance arm and carried thereby, and a weighing receptacle 39 which is supported on suitable framing 40 which is connected with the opposite end of the balance arm 36. The weighing receptacle is mounted upon the receptacle frame 40 in an inclined position, and is provided with an inlet opening 41 at the upper end thereof, and is also provided with a discharge opening 42 in the lower end thereof. The side walls 43 of the receptacle 39 converge downwardly adjacent the discharge opening 42 to quickly guide the material or potatoes in the receptacle through the outlet. A forwardly and downwardly projecting guide or shelf 44 is affixed in the receptacle below the inlet opening 41 thereof to carry the potatoes downwardly into the receptacle before the potatoes are permitted to fall to the bottom of the receptacle and the potatoes are thereby more efficiently accumulated in a pile adjacent to the outlet of the receptacle so as to be immediately discharged when the outlet is opened.

Means are provided in the receptacle to define a pair of separate compartments 45 and 46. In the form shown, such means include an upright swingable wall 47 which extends generally longitudinally of the receptacle and diagonally thereacross. Wall 47 is swingably mounted on an inclined shaft 48 which extends substantially normal in relation to the bottom of the receptacle and extends therethrough. The upper end portion 49 of wall 47 is swingable to opposite sides of the inlet opening 41 and defines an inlet gate for controlling the material inflow to the separate compartments 45 and 46. In the full line position shown, the upper end portion 49 of wall 47 obstructs material flow into compartment 45 and directs material flow from the inlet 41 into the compartment 46. When the wall 47 is swung to the opposite position as shown in dotted lines in Fig. 3, the upper portion 49 thereof obstructs material flow into compartment 46 and directs material flow into compartment 45 from the inlet.

The lower end portion 50 of wall 47 is swingable across the outlet opening 42 to the opposite sides thereof and defines an outlet gate controlling the material outflow from the compartments 45 and 46. In the full line position shown, the lower end portion 50 obstructs the flow from compartment 46 to the outlet and permits outflow from the compartment 45 to the outlet. When the gate 47 is swung to the dotted position thereof shown in Fig. 3, the lower end portion 50 of wall 47 obstructs flow from compartment 45 to the outlet 42.

The swingable wall 47 is, for the most part, constructed of rigid sheet material such as sheet iron, and the upper end portion 49 of wall 47 is constructed of flexible material such as heavy fabric belting impregnated with rubber or the like. The flexible upper flap 49 of the swingable wall 47 is provided with a notch or recess 51 therein which receives the deflector shelf 44 and permits the upper terminal edge of the flap 49 to be disposed in close proximity with the inlet opening.

Means are provided for swinging the wall 47 and shaft 48 and in the form shown, such means include a pair of aligned electric solenoids 52 and 53 which are carried on the receptacle frame work 40 below the weighing receptacle 39. The solenoids 52 and 53 have interconnected and aligned movable armatures 54. A swing arm 55 is affixed to the lower end of shaft 48 and has a slot 56 formed in the outer end thereof. A pin 57 is affixed to the solenoid armatures 54 and extends through the slot 56 of the swing arm 55 for providing a driving connection between the solenoids and the swingable wall 47. Detailed description of the solenoid operation will be included hereinafter in connection with the circuit arrangement shown in Fig. 5.

The upper portion of weighing receptacle 39 is open adjacent the inlet opening 41 and substantially at 58 to provide easy access for the materials flowing inwardly of the receptacle. A substantially upright baffling wall 59 is provided at the top of the receptacle for deflecting material such as potatoes downwardly into the receptacle.

The feeding conveyor mechanism 14 comprises a multi-speed vibrating conveyor for receiving potatoes and the like from the upper end of belt conveyor 16 and delivering the potatoes at a desired rate into the inlet of weighing receptacle 39. Vibrating conveyor 14 is provided with a material-carrying trough or container 60 having a closed receiving end 61 having an open top and an open discharging end 62, the bottom surface of which extends slightly inwardly through the inlet opening 41 of weighing receptacle 39. The bottom surface 63 of the receiving end 61 of the trough 60 is inclined so as to cause the potatoes falling thereonto to be moved forwardly into the trough by inertia.

The trough 60 is carried on support members 64 which are supported by and affixed to inclined leaf springs 65, the bottom ends of which are carried on a base 66 which is affixed to the machine-supporting structure 10. An electric solenoid 67 is also carried on the base 66 and has its armature 68 drivably connected with the trough supporting member 64. Multi-speed operating mechanism indicated in general by numeral 69 is provided for operating the electric vibrator solenoid 67 for causing vibration of the trough 60, and the operating mechanism 69 is connected with the solenoid 67 as hereinafter described in connection with the description of Fig. 5.

Means are provided for directing the potatoes flowing outwardly through the receptacle outlet 42 and into a bag shown in dotted lines in Fig. 1 and indicated by letter B.

Such means include a bagging spout which is indicated in general by numeral 70. The opposite sides 71 and 72 of the bagging spout 70 are swingably or hingedly connected at 73 and 74 to mounting members 75 which are rigidly affixed to the supporting structure 10. The opposite sides 71 and 72 of the spout have inwardly turned flanges 76 at the upper side of the bagging spout and the opposite sides 71 and 72 of the spout also have inwardly extending and overlapping bottom members 77 and 78 formed integrally thereof. The bottom members 77 and 78 are movable relative to each other and are interconnected for limiting the relative movement thereof. Member 77 has an arcuate slot 79 therein and a pin 80 extends through the slot 79 and is secured to the member 78. A compression spring 81 bears against depending lugs which are secured to the members 77 and 78 and the spring urges the opposite sides 71 and 72 of the spout away from each other.

The side members 71 and 72 of the spout 70 are constructed to facilitate swingable adjustment of the top flanges 76 with respect to the bottom flanges 77 and 78. The side members 71 and 72 have upper portions 71a and 72a, as best seen in Fig. 1, which are swingable upwardly and downwardly about pivot bolts 72b to facilitate increasing or decreasing the discharge opening of the bagging spout for accommodating different sized bags.

It will also be noted that the bottom members 77 and 78 of the bagging spout have downwardly extending lips 77a and 78a which facilitate holding the bag B in open condition at the discharge end of the spout.

Control apparatus is provided for operating the clutch 27 in response to the quantity of potatoes carried in the trough 60 of the vibrating conveyor 14 to thereby stop the belt conveyor 16 and permit the quantity of potatoes in the trough 60 to be decreased. The speed of operation of the entire machine is thereby synchronized. In the form shown, such means include a depending control member or plate 82 swingably mounted on the supporting structure 10 and extending downwardly into the trough 60. The control member 82 operates a microswitch 83 which is secured on the supporting structure adjacent the plate 82 to be engaged thereby when the lower portion of plate 82 is swung forwardly due to an overload of potatoes in the trough 60. As more fully described hereinafter, the electric solenoid 27 is operated when switch 83 is closed due to swinging of control member 82.

Weight-responsive control mechanism is provided for operating the swingable wall 47 in the weighing receptacle 39 and the electric solenoids 52 and 53 when a predetermined weight of potatoes is carried in one of the receptacle compartments. In the form shown, such means include a microswitch 84 secured to a suitable mounting plate 85 which is affixed to the supporting structure or base 35 of the scale mechanism. A movable arm 86 is connected to the balance arm 36 of the scale mechanism to be swung when the weighing receptacle is being filled and when the balance arm is swung and the movable arm 86 has an adjustable switch-operating finger or lug 87 mounted thereon for engaging and operating the microswitch 84. Normally the finger 87 will be adjusted to operate the switch 84 when the predetermined weight of potatoes to be measured, such as ten pounds, is contained in one of the receptacle compartments. As more fully described hereinafter, in connection with Fig. 5, operation of microswitch 84 causes the swingable wall 47 to reverse its position to permit dumping of potatoes from one of the compartments and to cause filling to commence in the other compartment.

Weight-responsive control mechanism is also provided for decreasing the speed of operation of vibrating conveyor 14 as the weight of potatoes in one of the compartments approaches the predetermined weight to be measured, so as to decrease the rate at which potatoes are supplied into the weighing receptacle 39 and thereby facilitate obstructing the inflow of potatoes into a particular compartment at the precise moment at which the predetermined weight is reached. In the form shown, such mechanism includes a microswitch 88 which is also mounted on the plate 85. An actuating finger or lug 89 is adjustably mounted on the arm 86 in alignment with the microswitch 88 for operating the same. Normally the finger 89 is adjusted to operate switch 88 when the weight of potatoes in the compartment being filled is approximately one-half pound less than the weight to be measured, that is, in the case that ten pound weights of potatoes are being measured, switch 88 operates when the weight of potatoes in a compartment reaches approximately nine and one-half pounds. As will be more fully described in connection with Fig. 5, operation of microswitch 88 changes the speed of operation of the vibrating conveyor 14.

The circuit diagram shown in Fig. 5 includes a source of power connected to wires 90 which may be connected to the power buss in the building. The weight-responsive controls shown on the left side of the circuit diagram and indicated by the bracket 91 are duplicated on each side of the bagging machine for operating the separate weighing receptacles and the movable walls therein, and the vibrating conveyors. The right hand portion of the circuit diagram indicated in general by the numeral 92 controls the speed of operation of the belt conveyors in response to the depth of potatoes in the vibrating conveyor trough 60.

A power control switch 93 is provided in the buss for each of the circuits 91.

The weight-responsive gate operating mechanism includes the microswitch 84 which is connected between one side of the buss 90 and a solenoid 94, the other side of which is connected to the other side of the power buss. A reversible switch 95 is associated with solenoid 94 to be operated by the armature thereof. Switch 95 is of the reversing type which holds itself in one position or the other after the solenoid 94 has been de-energized, and the solenoid 94 and switch 95 operate in a fashion very similar to a latching type relay. The winding of relay 96 is connected to one side of the power buss through the contact of switch 95 and is connected directly to the other side of the power buss. Relay 96 is of the double throw type and relay 96 has a pair of contacts 96a and 96b, which are respectively connected to gate operating solenoids 52 and 53, the other sides of which are connected directly to one side of the power buss. The movable contact member 96c of relay 96 is connected to the other side of the power buss. It will be noted that one of the solenoids 52 or 53 is always energized to hold the gate 47 in the desired position.

The vibrator conveyor solenoid 67 is connected at one side directly to the power buss and is connected through the contacts 97a of relay 97 and the speed regulating control 69 to the other side of the power buss. In the normal position of contacts 97a, the conveyor solenoid 67 is connected to the high speed vibrator output terminal 98 of the control mechanism 69, and in shifted position of the relay contacts 97a, the conveyor solenoid 67 is connected to the low speed vibrator terminal 99. The vibrator control 69 is manually controllable by rotating handles 100 and 101 for varying the frequency of high speed and low speed vibrations respectively. Relay 97 is connected to one side of the power buss through microswitch 88 and is connected directly to the other side of the power buss.

The belt conveyor controlling mechanism 92 includes a manual control switch 102 in the power buss, a driving motor 28 which is connected directly across the power buss and the solenoid operated clutch mechanisms as previously described. The clutch operating solenoid 33 is connected through the contacts 103a of relay 103 to one side of the power buss and is connected directly to the other side of the power buss. The relay 103 is connected directly to one side of the power buss and is connected through switch 83 to the outer side of the power buss.

The clutch operating solenoid 33' for the other belt conveyor is controlled similarly as above described, and is connected through the contacts of relay 103' which is operated by a microswitch 83'.

In operation, potatoes are supplied into the hopper 21 and are normally carried rapidly upwardly by the belt conveyor 16 and are deposited into the receiving end of the vibrating conveyor trough 60. Normally the vibrating conveyor operates at high speed so as to move the potatoes rapidly through the trough 60 and into the weighing receptacle. In the position of wall 47 as shown in Fig. 2, potatoes will be deposited in the compartment 46 of the weighing receptacle. Wall 47 is maintained in that position because solenoid 53 is energized. Potatoes will be supplied into the compartment 46 until the weight of potatoes in the compartment very nearly approximates the desired weight to be measured, such as nine and one-half pounds. At this time finger 89 is moved upwardly by arm 86 to operate microswitch 88 which closes to energize relay 97, the contacts 97a of which connect the vibrator solenoid 67 to the slow speed contact 99 of the vibrator control mechanism. Potatoes will continue to be supplied at this somewhat slower speed through the vibrator trough 60 and through the compartment 46. When the quantity of potatoes in the compartment 46 reaches the desired predetermined weight, such as ten pounds plus one potato, arm 86 will swing finger 87 into engagement with microswitch 84 to close the same and instantaneously cause operation of the swinging wall 47 so as to swing the upper and lower portions thereof across the inlet and outlet openings of the weighing receptacle respectively. Potatoes will continue to flow from the vibrating conveyor trough 60 and are now directed by the inlet gate 49 into compartment 45. The solenoid 94 is energized to operate switch 95 by closing of microswitch 84. When switch 95 operates, relay 96 is de-energized causing the contact 96c thereof to de-energize gate operating solenoid 53 and to energize gate operating solenoid 52. When solenoid 52 is operated, the movable wall 47 swings to its reverse position immediately.

The instant that wall 47 swings to its other position, potatoes will begin to spill out of compartment 46 and thereby reduce the weight of material in the weighing receptacle. This reduction of weight causes downward swinging of arm 86 which causes fingers 87 and 89 to disengage the switches 84 and 88 respectively. Re-opening of switch 88 has the immediate effect of increasing the speed of operation of the vibrating conveyor by de-energizing the relay 97, the contacts of which re-connect vibrator solenoid 67 to the high speed vibrator control contact 98. High speed operation of vibrating conveyor 14 is resumed substantially simultaneously with the swinging of wall 47 and potatoes are thereby immediately supplied into the other compartment 45 at a high rate of speed.

Re-opening of microswitch 84 causes solenoid 94 to de-energize, but there is no further effect because the switch 95 holds itself in its newly attained position. Relay 96 will remain de-energized and the contacts 96c thereof will hold gate operating solenoid 52 in an energized state.

As the wall 47 is swung to its new position, the potatoes previously collected in compartment 46 fall to the outlet opening 42 in a mass agglomerate. A portion of the potatoes on the top of the heap will engage the retaining flap 104 which is disposed in the upper portion of the outlet opening 42 and the potatoes will move in a steady stream for an instant into the bagging spout 70. A bag will be held over the lower end of the bagging spout substantially as shown in Fig. 1 and in order to cause rapid movement of the potatoes through the bagging spout, even though the potatoes be of odd shapes such as the elongated russet potatoes, the opposite sides 71 and 72 of the bagging spout will be oscillated inwardly and outwardly toward and away from each other so as to successively constrict and expand the lower end of the bagging spout. This has the effect of jostling the potatoes in the bagging spout and orienting them with respect to each other and with respect to the spout so as to prevent a jam from forming in the spout.

When the compartment 45 is filled with potatoes to the predetermined weight to be measured, the microswitch 88 will again be operated to slow the vibrating conveyor and the microswitch 84 will again be closed when the precise predetermined weight of potatoes is collected. When the switch 84 is operated, solenoid 94 is energized and the switch 95 is moved from the dotted position thereof to the full line position thereof and will hold itself in that position so as to cause de-energization of solenoid 52 and de-energization of solenoid 53.

As the predetermined weight of materials is collected in one of the compartments and the gate is operated, a potato may be disposed in close proximity with the upper end portion of the movable wall 47, and because the upper end portion 49 of the wall 47 is constructed of a flexible material, it may engage such a potato without damaging it and the upper end portion 49 of the wall 47 may pass by that potato so as to cause it to fall into the other compartment.

If the vibrating conveyor is not operating fast enough to handle all of the potatoes carried thereto by the belt conveyor 16, potatoes will begin to pile up in the trough 60 and when the potatoes in the trough 60 reach a predetermined depth, one of the potatoes will engage and move the depending swingable plate 82 and cause operation of the microswitch 83. When microswitch 83 is operated, relay 103 is energized to close the contacts 103a thereof. Closure of contact 103a causes energization of the clutch operating solenoid 33 and the armature of the solenoid is withdrawn to swing the arm 32 and cause disengaging of the clutch mechanism 27. Disengaging of clutch mechanism 27 opens the driving connection to belt conveyor 16 and the belt conveyor will therefore stop. When the quantity of potatoes in the vibrating conveyor trough 60 is reduced, control member 82 swings back to its normal position causing microswitch 83 to open whch deenergizes relay 103 and thereby causes de-energization of solenoid 33 which permits spring 32a to move the clutch arm 32 into clutch-engaging position. Conveyor 16 will thereupon be operated.

By operating the high speed control handle 100 of the vibrator control mechanism 69, the speed of operation of the entire machine may be controlled. By this control the speed at which the potatoes are supplied into the weighing receptacle may be varied and the potatoes will be supplied to the vibrating conveyor trough in relation to the quantity of potatoes contained therein. It has been experienced that on each side of this machine, sustained high speed operation at a rate of approximately nine to ten 10-pound bags of potatoes per minute can be bagged through the use of this machine. This rate substantially approaches the maximum capacity of a person to hold the bags under the bagging spout and to remove the bags therefrom when filled. Somewhat higher speeds than that indicated have been attained for short operation. Of course when the machine is used to fill smaller bags such as 5-pound bags, the number of bags per minute can be substantially increased so that more than one man is required for placing the bags on the bagging spout and removing the bags when filled.

It will be seen that I have provided a new and improved machine for weighing and segregating predetermined quantities of potatoes and the like, wherein potatoes are continuously supplied into a multi-compartmented weighing receptacle and the potatoes are alternately directed into one compartment and then the other and alternately dumped from the compartments when the same are filled to thereby facilitate extremely rapid handling of the potatoes without necessitating any stoppage of the flow of potatoes in the weigh receptacle.

It should also be apparent that I have provided in an improved potato weighing and segregating machine, a single gate member in a multi-compartmented weighing receptacle for simultaneously and in a single movement of the member, obstructing potato inflow into one of the compartments and permitting dumping of that compartment, and directing potato inflow into the other compartment and closing the discharge thereof.

It should also be noted that I have provided in a rapidly operated potato weighing and segregating machine, an improved discharge spout, the side walls of which may be moved relative to each other to agitate the potatoes therein and thereby cause rapid flow of the potatoes through the spout.

It will, of course, be understood that various changes may be made in the form, details, arrangement and proportions of the parts without departing from the scope of my invention which consists of the matter shown and described herein and set forth in the appended claims.

What is claimed is:

1. A machine for measuring and segregating quantities of predetermined weight of material composed of a mass of individual articles such as potatoes and the like, comprising a supporting structure, a scale mechanism on the supporting structure and including a weighing receptacle having an inlet and having outlet means, a multi-speed continuously operating conveyor on the supporting structure and arranged to continuously supply such articles to the receptacle inlet, material flow control means in the receptacle and defining a pair of compartments, one being in flow communication with the inlet and the other being in flow communication with the outlet, said flow control means being arranged to interchange the flow communication of said compartments with the inlet and outlet means whereby to facilitate continuous reception of material from the conveyor and to permit periodic dumping of material from the compartments, weight-responsive operating mechanism connected with the scale mechanism and with said flow control means for operating said flow control means to dump material from a compartment when the predetermined weight of material is contained therein, and weight-responsive control mechanism connected with the scale mechanism and with said conveyor for decreasing the speed thereof as the quantity of material in a compartment approaches said predetermined weight and for increasing the conveyor speed again when the materials are dumped from the compartment.

2. In a machine for measuring and segregating accurately weighed quantities of material composed of a mass of individual articles such as potatoes and the like, comprising a supporting structure, scale mechanism on the supporting structure and including a weighing receptacle having an upper portion with an inlet opening therein and having a lower portion with an outlet opening therein, a continuously operating multispeed conveyor on the support structure and arranged to continuously supply such articles into the receptacle inlet, a generally upright wall in the receptacle and extending generally longitudinally thereof and diagonally thereacross, said wall having an upper edge portion disposed adjacent one side of the inlet opening and having a lower edge portion disposed adjacent one side of the outlet opening to define a pair of compartments in the receptacle, one in material-flow communication with the inlet opening and the other in material-flow communication with the outlet opening, said wall being swingably mounted intermediate the ends thereof in said receptacle whereby to permit shifting of the upper and lower edge portions thereof to the opposite sides of the inlet and outlet openings respectively, and weight-responsive operating mechanism connected with the scale mechanism and with said wall for swinging said wall from one position to another position in order to dump the articles from one compartment when a predetermined weight of materials is carried therein, and weight-responsive control mechanism connected with the scale mechanism and with said conveyor for decreasing the speed thereof as the quantity of material in the compartment approaches a predetermined weight and for increasing the conveyor speed again when the materials are dumped from the compartment.

3. In a machine for handling bulky materials such as potatoes and the like, said machine having means for segregating and discharging predetermined quantities of materials, a discharge spout on the machine and positioned for receiving materials discharged from the machine, said spout having a pair of opposite and inwardly and outwardly movable side walls, said side walls being movable to jostle the potatoes and thereby prevent jamming of potatoes in the spout.

4. In a machine for measuring and segregating weighed quantities of material composed of a mass of individual articles such as potatoes and the like, a weighing receptacle having an inclined bottom and having a lower end with a discharge opening therein, a movable discharge gate associated with the discharge opening for restricting flow of potatoes therethrough, said receptacle also having an upper end wall with an inlet opening therein spaced above said receptacle bottom, and a potato-guiding shelf spaced above the receptacle bottom and below the inlet opening and adjacent thereto, said shelf being inclined and disposed substantially parallel with the receptacle bottom, whereby potatoes, supplied through the inlet opening, will pass over said shelf and be guided thereby to accumulate in a pile against the discharge gate to facilitate rapid discharge of the potatoes when the gate is open.

5. A machine for measuring and segregating accurately weighed quantities of material composed of a mass of individual articles such as potatoes and the like, comprising a supporting structure, a scale mechanism on the supporting structure and including a weighing receptacle having an inclined bottom and having an upper portion with an inlet opening therein and also having a lower portion with an outlet opening therein, a continuously operating multi-speed conveyor mounted on the supporting structure and arranged to continuously supply such articles to the receptacle inlet opening, an elongate wall mounted in the receptacle and extending generally diagonally thereacross to define a pair of compartments, said wall having an upper end portion adjacent to the inlet opening, said upper portion including a flexible flap of material which will yield under the influence of a potato bearing thereagainst, one of said compartments being in material-flow communication with the inlet and the other in material-flow communication with the outlet, said wall being swingably connected intermediate the ends thereof to the receptacle whereby to reverse the flow communication of said compartments with the inlet and outlet openings respectively and thereby discharge material from one of the compartments and commence filling of the other compartment, and weight-responsive actuating mechanism connected with said wall for swinging the same across the inlet and outlet openings when a predetermined quantity of such materials is contained in one of the compartments and for decreasing the conveyor speed as the material in the compartment approaches said quantity, whereby to accurately weigh and segregate the quantities of such materials without causing damage to the potatoes as the gate is swung.

References Cited in the file of this patent

UNITED STATES PATENTS

| | | |
|---|---|---|
| 825,864 | Raquett | July 10, 1906 |
| 834,446 | Berg | Oct. 30, 1906 |
| 895,289 | McLeod | Aug. 4, 1908 |
| 984,537 | Buschman | Feb. 21, 1911 |
| 1,605,700 | Branaman | Nov. 2, 1926 |
| 2,266,906 | Rapp | Dec. 23, 1941 |
| 2,626,042 | Aldridge | Jan. 30, 1953 |
| 2,726,061 | Schieser | Dec. 6, 1955 |
| 2,850,255 | Gould | Sept. 2, 1958 |